(12) United States Patent
Reddy et al.

(10) Patent No.: US 9,360,746 B2
(45) Date of Patent: Jun. 7, 2016

(54) UNDERWATER IMAGE PROJECTION SYSTEM AND METHOD

(71) Applicant: Pentair Water Pool and Spa, Inc., Sanford, NC (US)

(72) Inventors: Rakesh Reddy, Deerfield Beach, FL (US); Bruce Johnson, Deerfield Beach, FL (US); Kevin Doyle, Deerfield Beach, FL (US)

(73) Assignee: Pentair Water Pool and Spa, Inc., Cary, NC (US)

( * ) Notice: Subject to any disclaimer, the term of this patent is extended or adjusted under 35 U.S.C. 154(b) by 0 days.

(21) Appl. No.: 14/618,946

(22) Filed: Feb. 10, 2015

(65) Prior Publication Data

US 2015/0153634 A1 Jun. 4, 2015

Related U.S. Application Data

(63) Continuation of application No. 13/626,867, filed on Sep. 25, 2012, now Pat. No. 9,134,599.

(60) Provisional application No. 61/678,606, filed on Aug. 1, 2012.

(51) Int. Cl.

| | |
|---|---|
| *G03B 21/14* | (2006.01) |
| *G03B 21/53* | (2006.01) |
| *G03B 21/608* | (2014.01) |
| *H04N 9/31* | (2006.01) |
| *H04N 5/74* | (2006.01) |
| *G03B 21/56* | (2006.01) |

(52) U.S. Cl.
CPC ............... *G03B 21/53* (2013.01); *G03B 21/14* (2013.01); *G03B 21/608* (2013.01); *H04N 5/74* (2013.01); *H04N 9/3182* (2013.01); *H04N 9/3185* (2013.01); *H04N 9/3194* (2013.01); *G03B 21/56* (2013.01)

(58) Field of Classification Search
USPC .................................... 353/28, 74, 121, 122
See application file for complete search history.

(56) References Cited

U.S. PATENT DOCUMENTS

| | | |
|---|---|---|
| 3,262,321 A | 7/1966 | Moul |
| 3,337,285 A | 8/1967 | Travis |
| 4,158,483 A | 6/1979 | Fisher |

(Continued)

FOREIGN PATENT DOCUMENTS

| | | |
|---|---|---|
| AU | 2007216901 B2 | 11/2008 |
| CN | 201180381 | 1/2009 |

(Continued)

OTHER PUBLICATIONS

"Pan-Tilt Unit-D46 Models," FLIR Systems, Inc., Boston, MA, 1 page. (http://www.flircom/mcs/view/?id=53703) (Accessed Jul. 30, 2013.

(Continued)

*Primary Examiner* — William C Dowling
(74) *Attorney, Agent, or Firm* — Quarles & Brady LLP

(57) ABSTRACT

Some embodiments include an underwater projection system having a water feature and an ambient light in communication with the underwater projection system. A projector is disposed within the water feature and is designed to project an image out of the water feature into a body of water. A controller is in communication with the projector and operates both the ambient light and the projector.

20 Claims, 12 Drawing Sheets

(56) References Cited

U.S. PATENT DOCUMENTS

| | | | |
|---|---|---|---|
| 4,196,461 A | 4/1980 | Geary | |
| 4,887,197 A | 12/1989 | Effinger | |
| 4,905,326 A | 3/1990 | Nakamura | |
| 5,271,106 A | 12/1993 | McClish | |
| 5,576,901 A | 11/1996 | Hanchett | |
| 5,846,135 A | 12/1998 | Hoskins et al. | |
| 5,934,796 A | 8/1999 | Quereau | |
| 6,086,215 A | 7/2000 | Giattano | |
| 6,115,511 A | 9/2000 | Sakai | |
| 6,278,373 B1 | 8/2001 | Jaurigue et al. | |
| 6,292,171 B1 | 9/2001 | Fu et al. | |
| 6,472,990 B2 | 10/2002 | Delmar | |
| 6,561,658 B2 | 5/2003 | Mochizuki | |
| 6,592,228 B1 | 7/2003 | Kawashima et al. | |
| 6,781,329 B2 | 8/2004 | Mueller et al. | |
| 6,827,464 B2 | 12/2004 | Koren et al. | |
| 6,857,746 B2 | 2/2005 | Dyner | |
| 6,906,686 B2 | 6/2005 | Ishikawa | |
| 6,936,978 B2 | 8/2005 | Morgan | |
| 6,951,411 B1 | 10/2005 | Kumar et al. | |
| 6,956,696 B2 | 10/2005 | Hackowski et al. | |
| 7,142,168 B1 | 11/2006 | Sinclair | |
| 7,161,311 B2 | 1/2007 | Mueller et al. | |
| 7,187,141 B2 | 3/2007 | Mueller et al. | |
| 7,274,382 B2 | 9/2007 | Plut | |
| 7,292,252 B2 | 11/2007 | Matsuda | |
| 7,303,301 B2 | 12/2007 | Koren et al. | |
| 7,357,525 B2 | 4/2008 | Doyle | |
| 7,410,268 B2 | 8/2008 | Koren et al. | |
| 7,413,319 B2 | 8/2008 | Longoria | |
| 7,471,432 B2 | 12/2008 | Pruyn | |
| 7,482,764 B2 | 1/2009 | Morgan et al. | |
| 7,524,069 B2 | 4/2009 | Murayama et al. | |
| 7,534,057 B2 | 5/2009 | Jones et al. | |
| 7,699,515 B2 | 4/2010 | Faber et al. | |
| 7,712,913 B2 | 5/2010 | Gardenier et al. | |
| 7,717,582 B2 | 5/2010 | Longoria | |
| 7,735,385 B2 | 6/2010 | Wilson et al. | |
| 7,740,367 B2 | 6/2010 | Koren | |
| 7,744,237 B2 | 6/2010 | Potucek et al. | |
| 7,810,942 B2 | 10/2010 | Kunkel et al. | |
| 7,862,179 B2 | 1/2011 | Shan et al. | |
| 7,982,935 B2 | 7/2011 | Grapov et al. | |
| 8,047,475 B2 | 11/2011 | Fukumoto et al. | |
| 8,057,112 B2 | 11/2011 | Amadril et al. | |
| 8,118,434 B2 | 2/2012 | Turner et al. | |
| 8,179,586 B2 | 5/2012 | Schofield et al. | |
| 8,801,191 B2 | 8/2014 | Nemeth et al. | |
| 2004/0085754 A1* | 5/2004 | Koren et al. | 362/96 |
| 2005/0035728 A1* | 2/2005 | Schanberger et al. | 315/291 |
| 2005/0041216 A1* | 2/2005 | Kobayashi | 353/69 |
| 2005/0047134 A1 | 3/2005 | Mueller et al. | |
| 2005/0146777 A1 | 7/2005 | Russell | |
| 2007/0257181 A1 | 11/2007 | Dittmer et al. | |
| 2008/0068493 A1 | 3/2008 | Hida et al. | |
| 2009/0061761 A1 | 3/2009 | Yang et al. | |
| 2009/0121657 A1 | 5/2009 | Erchak et al. | |
| 2009/0174868 A1 | 7/2009 | Matsuda | |
| 2010/0019686 A1 | 1/2010 | Gutierrez, Jr. | |
| 2010/0031767 A1 | 2/2010 | Chenu | |
| 2010/0057803 A1 | 3/2010 | Ellis et al. | |
| 2010/0128122 A1 | 5/2010 | Wright et al. | |
| 2010/0146440 A1 | 6/2010 | Seong et al. | |
| 2010/0250449 A1 | 9/2010 | Doyle et al. | |
| 2010/0302515 A1 | 12/2010 | Plut | |
| 2010/0331857 A1 | 12/2010 | Doyle | |
| 2011/0163677 A1 | 7/2011 | Baret | |
| 2011/0246509 A1* | 10/2011 | Migita | A61B 5/222 707/769 |
| 2011/0297655 A1 | 12/2011 | Ueda | |
| 2012/0035469 A1 | 2/2012 | Whelan | |
| 2012/0133911 A1 | 5/2012 | LaDuke | |
| 2013/0215012 A1 | 8/2013 | Reddy et al. | |
| 2013/0215394 A1* | 8/2013 | Reddy et al. | 353/31 |
| 2013/0308064 A1 | 11/2013 | LaDuke | |
| 2014/0078409 A1* | 3/2014 | Wang | 349/5 |
| 2014/0085613 A1* | 3/2014 | Doyle et al. | 353/69 |
| 2014/0210373 A1 | 7/2014 | Baret | |

FOREIGN PATENT DOCUMENTS

| | | |
|---|---|---|
| DE | 102009059689 | 6/2011 |
| EP | 0838696 | 4/1998 |
| EP | 1376509 A2 | 1/2004 |
| FR | 2863345 A1 | 9/2006 |
| JP | H09021245 | 1/1997 |
| JP | 2008216412 * | 9/2008 |
| WO | 9705595 A1 | 2/1997 |
| WO | 9931560 A2 | 6/1999 |
| WO | 2009008710 A1 | 1/2009 |
| WO | 2009156602 A1 | 12/2009 |
| WO | 2010043956 A1 | 4/2010 |
| WO | 2012136907 A1 | 10/2012 |
| WO | 2014043135 A1 | 3/2014 |
| WO | 2014043139 A2 | 3/2014 |

OTHER PUBLICATIONS

Model PTU-D46, Quick Configuration Guide,: Directed Perception, Burlington, CA, 6 pages. (http://www.dperception.com/pdf/products/PTU-D46/PTU-D46-Config.pdf) (Accessed Jul. 30, 2013).

John F. Aubin et al., "A Low Profile Three Axis Gimbal Assembly for Radome Measureiments", Antenna Measurement Techniques Association 24th Annual Meeting & Symposium, Cleveland, Ohio, Nov. 3-8, 2002, Session 15, paper #A02-064, 5 pages. (http://microwavevision.com/sites/www.microwavevision.com/files/files/ORBIT-FR-LowProfileThree AxisGimbalAsembly-02-15-07-Aubin.pdf) (Accessed Jul. 30, 2013).

NITISH SWARUP, Title: "Design and Control of Two-Axis Gimbal System for use in Action Vision," Massachusetts Institute of Technology, May 1993. Bachelor's Thesis, 44 pages. (http://dspace.mit.edu/bitstream/ handle/1721.1/12444/29874210.pdf?sequence=1) (Accessed Jul. 30, 2013).

"New products and services from IDA Members: Accurate INOX waterproof"; International Laser Display Assoc., Oct. 2006, 9 pages. (http://laserist.org/newproducts.htm) (accessed Jul. 30, 2013).

H.C. Gijie, "Conversations with Spaces", Feb. 15, 2009 (http://hcgilijie,wordpress.com/tag/projection/), 13 pages. (Accessed Jul. 30, 2013).

International Search Report from corresponding International application No. PCT/US13/53084 mailed Dec. 6, 2013.

International Search Report and Written Opinion of the International Searching Authority issued in PCT/GB2013/050388, mailed May 17, 2013, 12 pages.

International Search Report issued in PCT/US2013/053315, mailed Jan. 3, 2014, 1 page.

\* cited by examiner

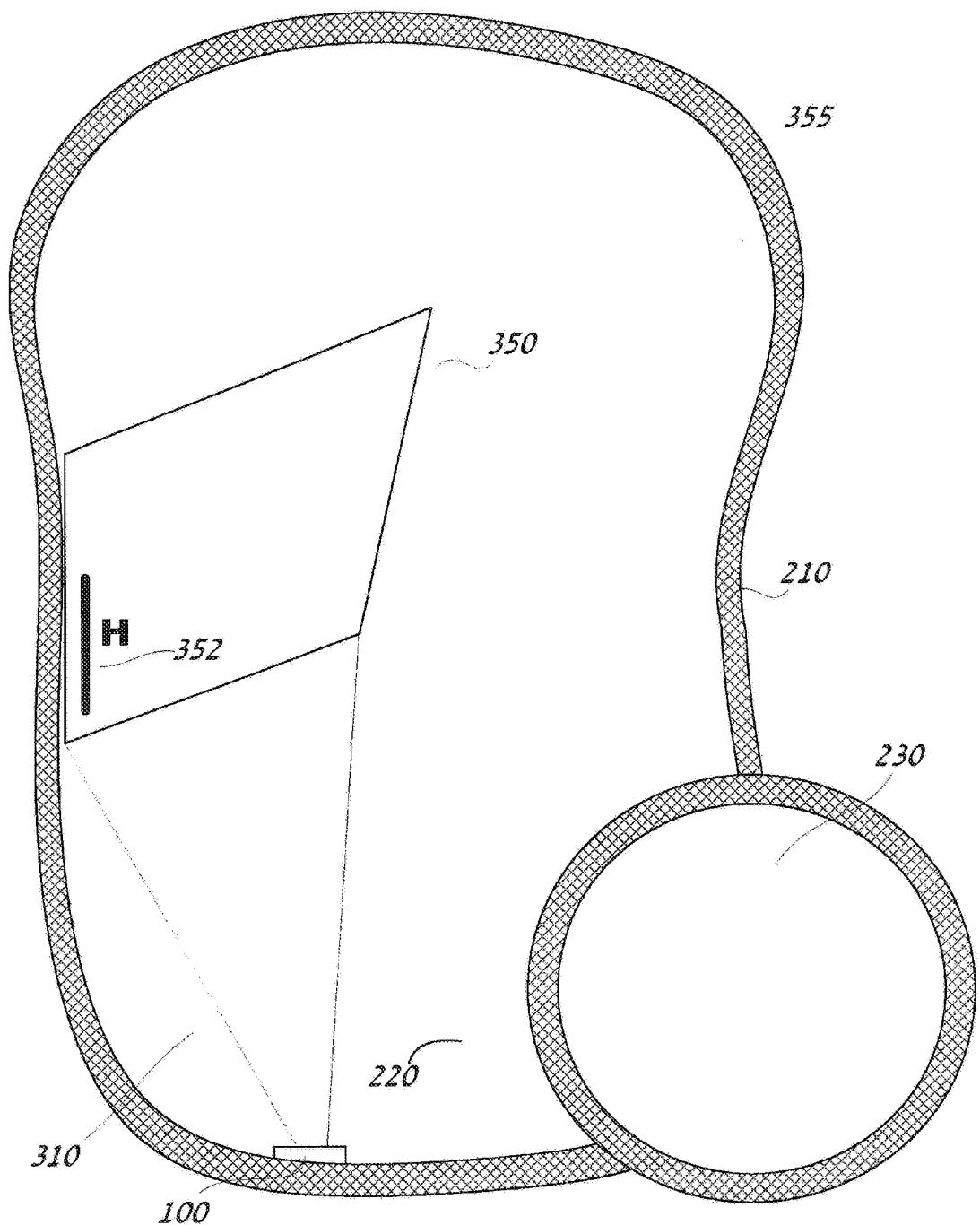

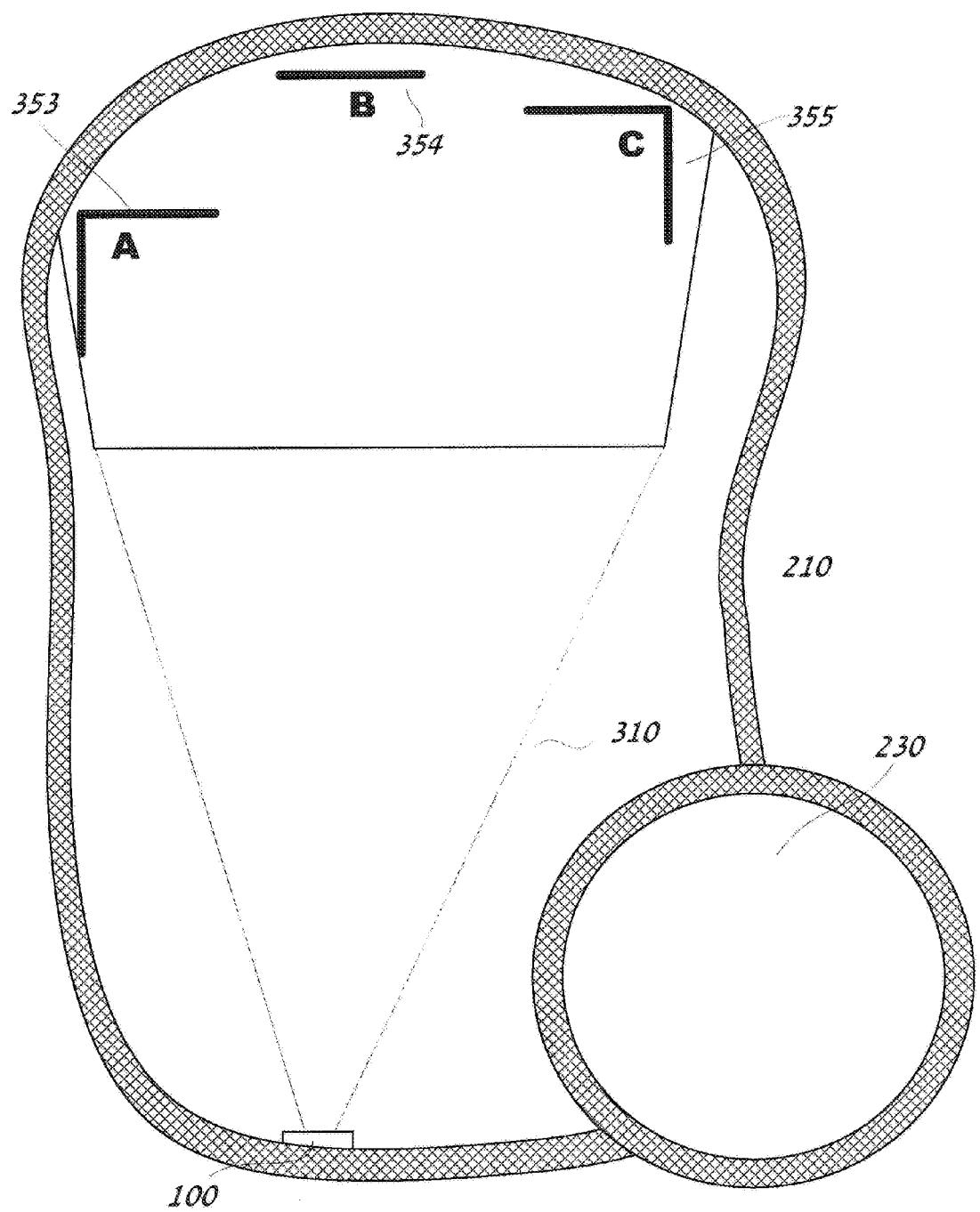

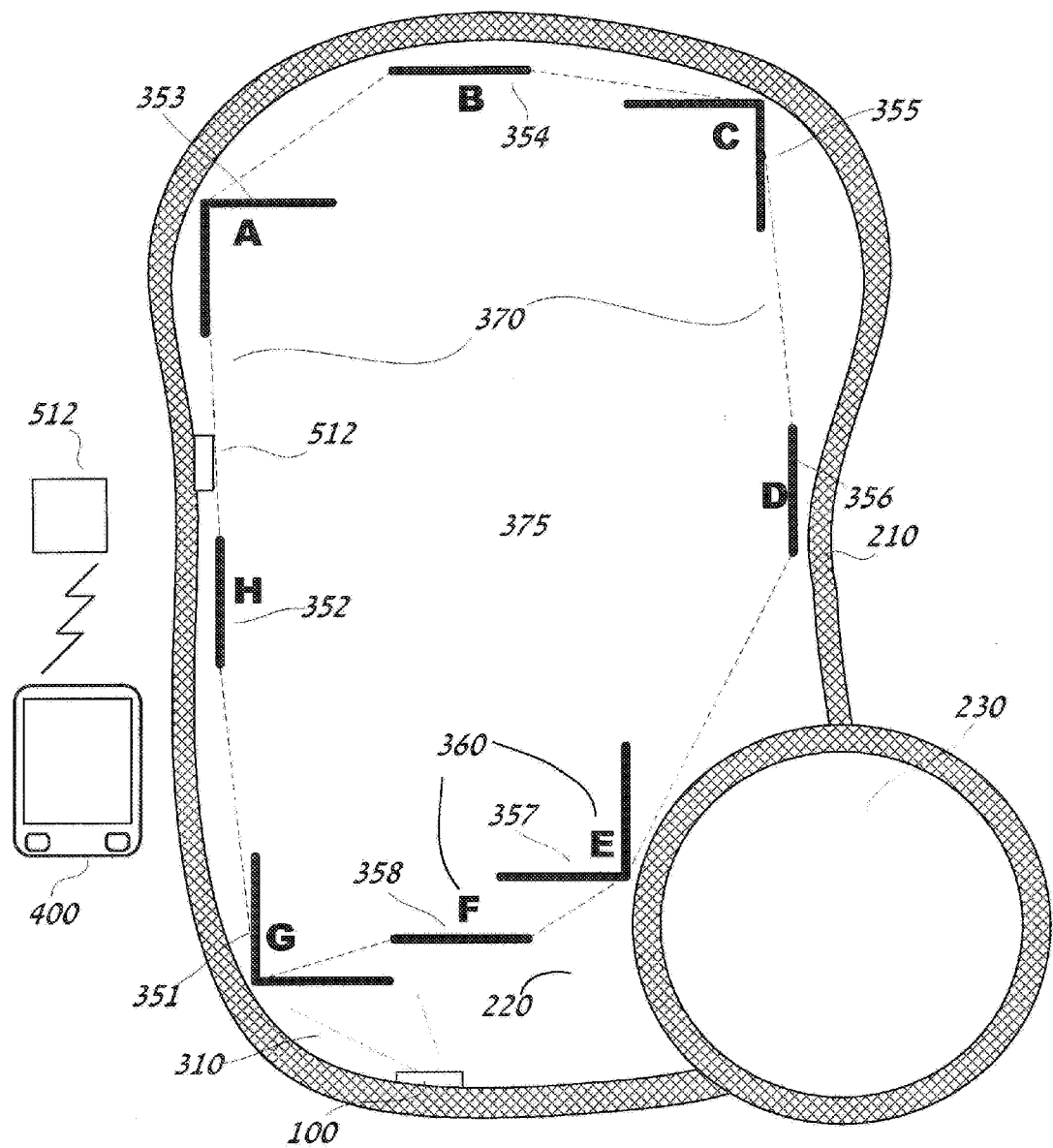

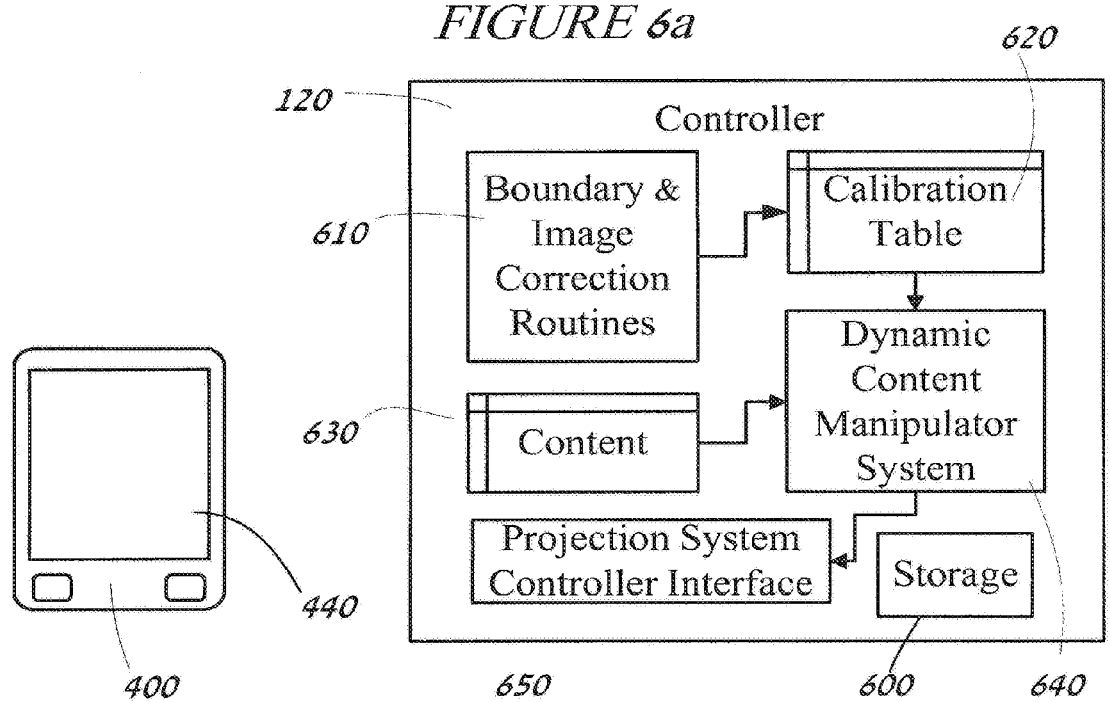

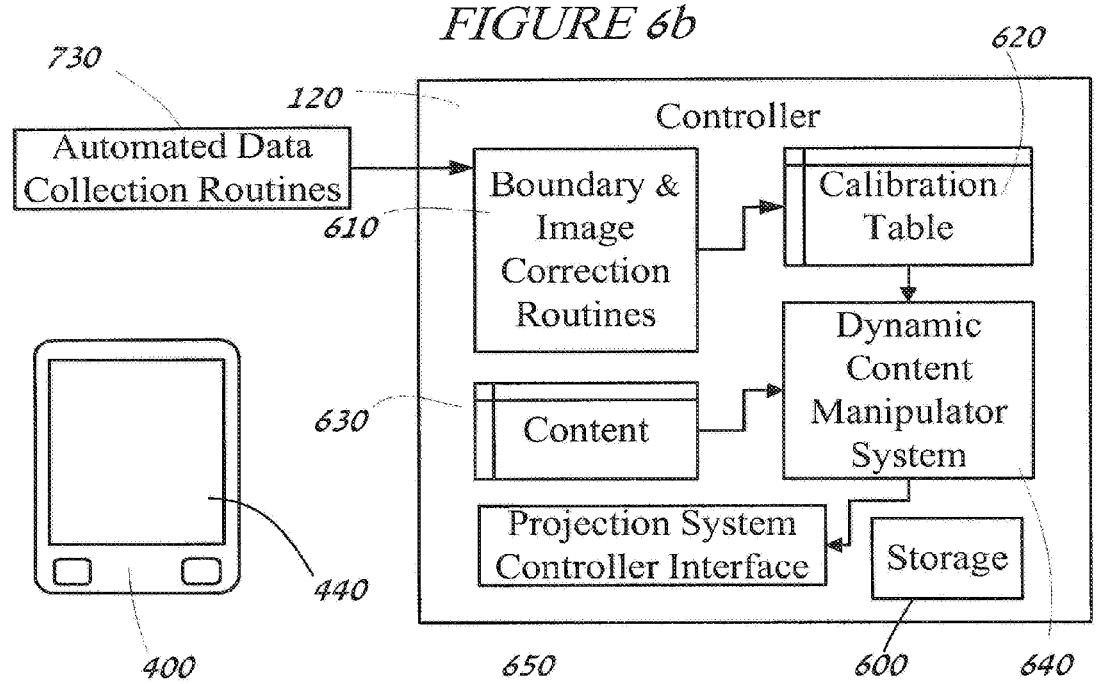

UNDERWATER IMAGE PROJECTION SYSTEM AND METHOD

RELATED APPLICATIONS

This application claims priority under 35 U.S.C. §120 to U.S. patent application Ser. No. 13/626,867 filed on Sep. 25, 2012, which claims priority to U.S. Provisional Application No. 61/678,606 filed on Aug. 1, 2012, the entire contents of which are incorporated herein by reference.

COPYRIGHT NOTICE

Portions of the disclosure of this patent document contain material that is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND

In the field of image projection, a number of obstacles are provided to accurate projection of images, especially images on a non-uniform surface. This is further compounded when the image is projected in one composition or fluid environment and the observer is located outside of this composition or fluid environment. Or similarly, when the projection of the image and subsequent observation of the image are made in one fluid environment and the projected image target is in another fluid environment, resulting in unacceptable distortion. An example of this distortion can be seen when one observes fish in a body of water, the position of the fish observed is distorted as is the size and sometimes shape of the fish from a vantage outside the water. Additionally, in projecting images in the interior of a body of water like those in water features or in targeted natural water settings, such as but certainly not limited to pools, fountains, spas, sand bars, and the like, surface irregularities make correction in combination with the distortion effects difficult.

Some of the technical difficulties and issues in projecting images in these locations include accommodating the variables of transmissivity within the body of water, the variations between the transmissivity of the water and the interface with air and the location of an observer outside of the body of water, undulating contours and angles within the body of water and in the surfaces being projected upon within the body of water, observational variations based on the position of the observer, and similar variables which must be accommodated to provide ideal image viewing.

As such, a need exists for a projection system, a projection system controller, an underwater projection system, an underwater projection system controller, a computer enabled apparatus for controlling a projection system and/or an underwater projection system, a method of controlling a projection system and/or an underwater projection system, and a method of controlling and adjusting a projected image that overcomes these challenges and provides a robust image quality in a projected image with control of the projected light and, potentially, additional lighting. An in-situ projection system with user observed image control and correction is needed to address the myriad of complexities in projecting such quality images.

SUMMARY

Some embodiments include an underwater projection system having a water feature and an ambient light in communication with the underwater projection system. A projector is disposed within the water feature and is designed to project an image out of the water feature into a body of water. A controller is in communication with the projector and operates both the ambient light and the projector.

Other embodiments comprise an underwater projection system having a water feature and a projector disposed within the water feature. A controller is in communication with the projector and includes at least one of a boundary mapping module or an image correction module. The controller executes the at least one of the boundary mapping module or the image correction module in conjunction with displaying an image.

A further embodiment includes an underwater projection system having a water feature and a projector disposed within the water feature. A graphical user interface configured to receive an image from a user and in communication with the water feature. A controller is in communication with the projector and is configured to project the image into a body of water.

DESCRIPTION OF THE DRAWINGS

FIGS. 2A-2C show the application of a boundary mapping system for the underwater image projection system;

FIG. 2D shows a plan view of a further embodiment of the instant invention incorporating an automatic data collection module and hardware;

FIG. 6A shows a system component or module view of the controller of the instant invention;

FIG. 6B shows a further system component or module view of the controller of the instant invention with an automated data collection module.

DETAILED DESCRIPTION

Figure 1:
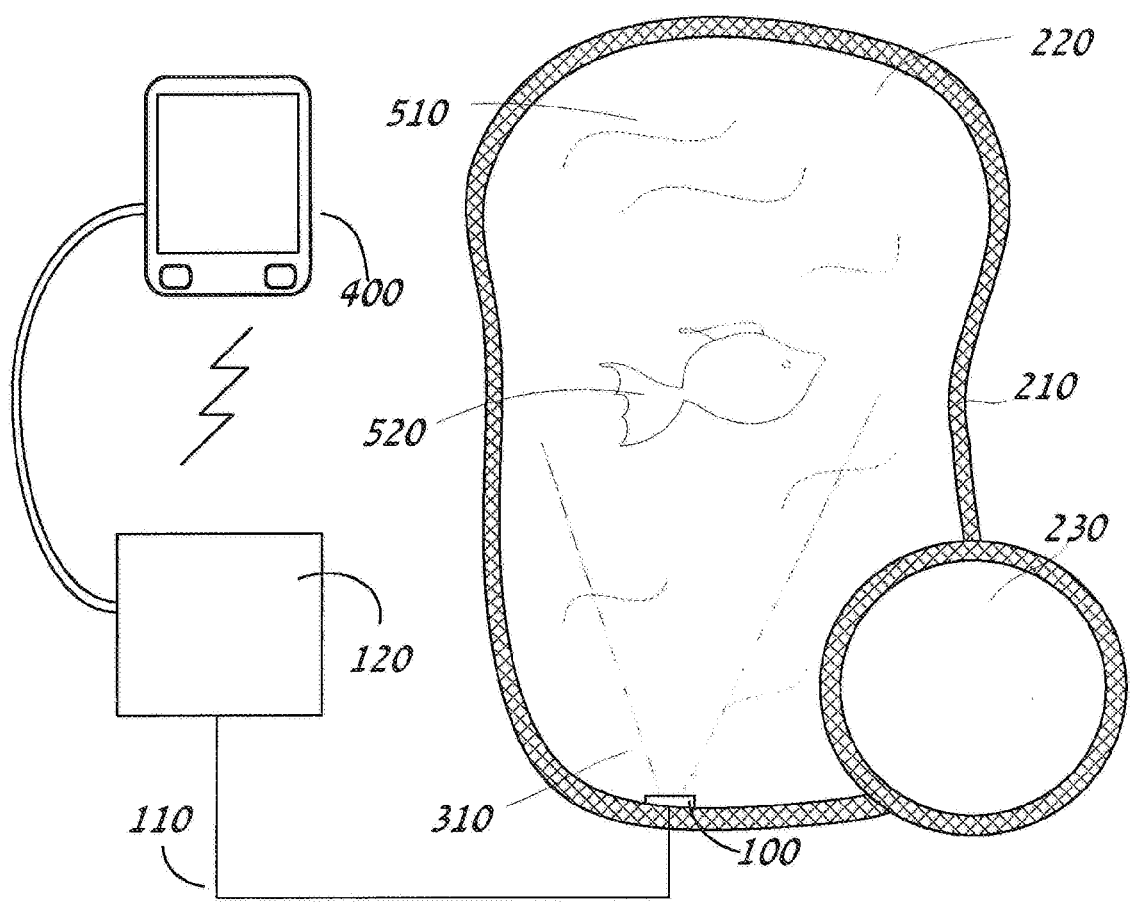
FIG. 1 shows a plan view of a water feature with underwater projection system according to one embodiment.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

The instant invention is directed to an underwater projection system and controller for configuring and controlling image projection in situ. Water has a different refractive index from air that adds to the optical deformation of the light as it exits a lens surface if it is out of the water, thus in-situ projection simplifies the necessary corrections. In the exemplary embodiment, both the boundary setting and the image correction modules of the controller are executed underwater so that the perspective distortion correction from projector to target is avoided. Thus, in-situ projection reduces the complexity of the corrections applied by the controller. Additionally, the boundary measurements and corrections of the exemplary embodiment of the instant invention being applied in-situ provides consistency and ease of operation. The user views the image at the target as projected in situ and applies the corrections as outlined below from outside the water. Thus, the focus of the projection system is set so that the water is in contact with the exterior lens and participates in the final optical manipulation. In the absence of the water in contact with the lens, the size, position, and focus of the objects are different and requires further adjustment calculations, which can be added in additional software in further embodiments of the instant invention. However, the exemplary embodiment of the invention described herein is directed to an underwater projection system. As water features often have complex geometric shapes that cannot be easily modeled onto software, this approach of in-situ projection with a user observing and guiding corrections from outside the water feature allows the user to simply move markers to specific points, thus defining the boundary point by point and applying corrections across the defined boundaries as observed without the variation from the projector being out of the water. Thus, the exemplary embodiment provides a novel control function for an underwater projector.

FIG. 1 shows a plan view of a water feature with underwater projection system. The system includes a user interface, in this case a graphical user interface (GUI) 400 that communicates, either through a wired coupling or wireless coupling or through a network, with a system controller 120. The system controller 120 controls an underwater image projection system 100. The underwater projection system has a lens (not shown) that is in contact with the water 220 of the water feature 210. This system projects an image 520 into the confines of the water feature 210 under the water 220. In this instance the water feature is a pool, however, the system may be used in fountains, pools, Jacuzzis, ponds, from the hull of a boat into a natural lake or ocean with a sand bar, or similar underwater uses. The control elements and software, described herein below, may also be utilized in above water applications such as theatrical or live show presentations or similar displays. Similarly, reference is made to the GUI 400, here shown as a tablet type computing/communications device. However, the GUI 400 may simply be an analog controller with buttons and an LCD interface for instance or LED lights and a series of input buttons. The specific design of the user interface may be varied to provide the necessary steps of boundary setting and graphical variable corrections specified herein without departing from the spirit of the invention.

In addition to the image projection elements of the underwater image projection system 100, the exemplary embodiment shown also includes optional ambient lights similar to conventional pool floodlights, that operate in conjunction with the image projection elements of the underwater image projection system 100 to provide optional ambient lighting effects 510. Although shown as a single device, the combination of the underwater projection system with an at least one ambient light (not shown) operating in a further installation is embraced in the instant invention or combined in similar manner. The underwater projection system 100 may also be operated independently without ambient lighting. Similarly, multiple underwater projection systems 100 working in the same water feature 210 are contemplated, as better seen in FIG. 7.

In addressing the unique nature of projecting a two dimensional image on the non-uniform surface of most water features 210 it is necessary for the system controller 120 to operate a visual correction system in projecting images in motion in the water feature, along the water feature, and images appearing around the surface of the pool or water feature 210. To this end, the software or modules residing on the controller 120 include an at least one boundary mapping routine or module for the image projection surfaces within the pool in conjunction with or operating independently from an at least one correction routine or module for correcting the projected images.

Figure 2A:
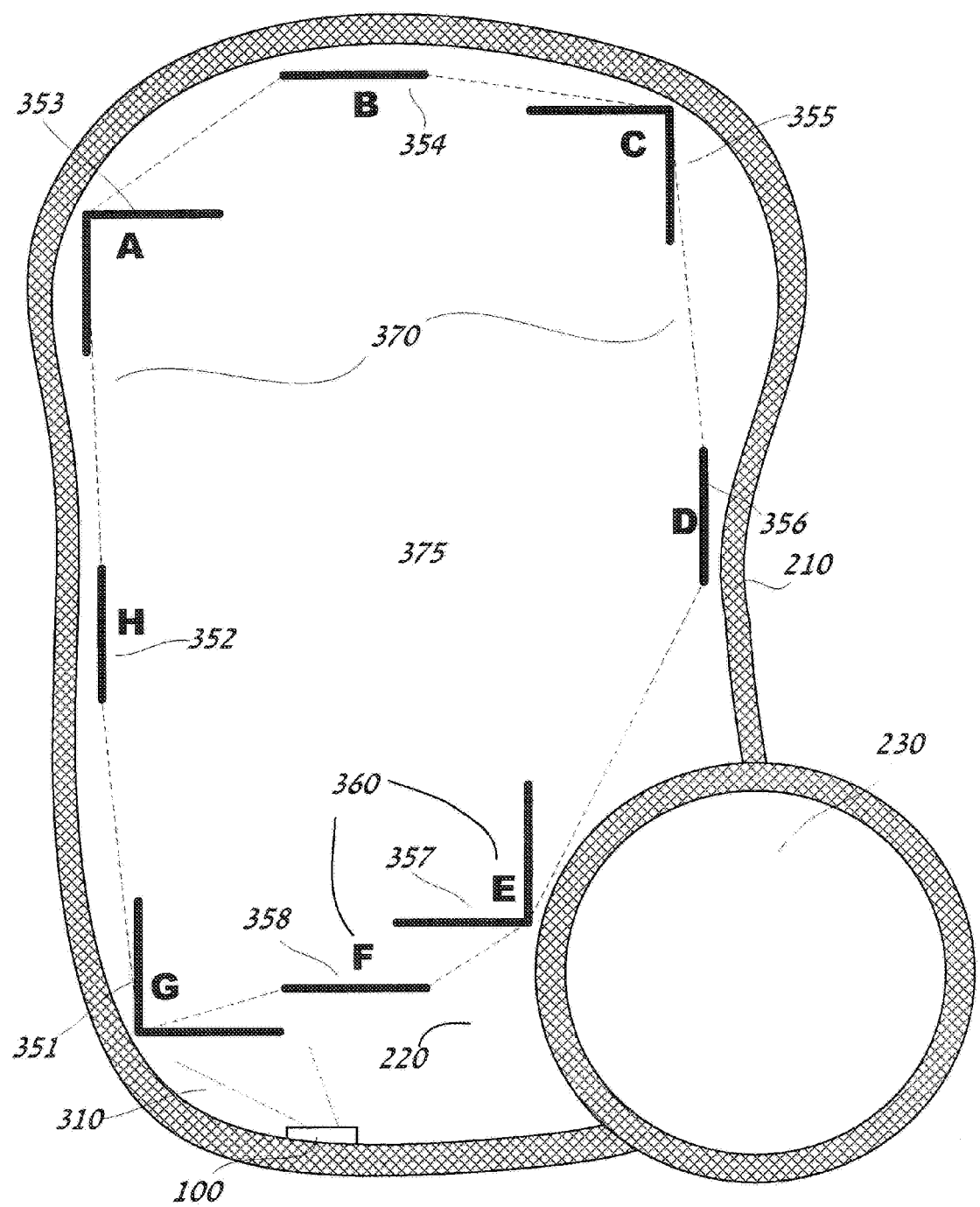

FIGS. 2A-2C show the application of a boundary mapping system for the underwater image projection system. The system projects through the underwater image projection system 100 a series of boundary patterns. In the embodiment shown, these are represented by the projected boundary shapes 351-358, labeled A-G in FIG. 2A. The system, in this exemplary embodiment, utilizes the underwater projection system in step by step fashion to project each boundary patterns or projected boundary shapes 351-358 sequentially. This is exemplified in FIG. 2B, where a single boundary image is being displayed in conjunction with the operation of the GUI 400 in a manner as shown and described in FIG. 3. In this instance boundary image "H" 352 is being shown in its placement within the water feature 210 as shown. The underwater projection system 100 is shown projecting the boundary image "H" 352 in the water feature. A frame 350 is shown representing the maximum extent or size of projection that is possible directly from the primary modulation or steering device (not shown); in this instance the total projection size is directly limited from the projection source aperture to a discrete portion of the water feature 210. The secondary modulation or steering device (not shown) allows for the frame 350 to be moved allowing for subsequent projection of other shapes in other parts of the pool such as the various locations shown in FIG. 2A of boundary shapes 351-358.

FIG. 2C shows another exemplary embodiment of the instant invention. As seen in FIG. 2C, in a further exemplary embodiment utilizing another form of projector with sufficient projector aperture to be able to project within a larger section of the boundary of the projection area at once, the controller 120 may project multiple selected boundary images at once, here shown as boundary images "A" 353, "B" 354, and "C" 355. In this instance, the aperture size of the projector in projection system 100 is sufficient that there is no secondary modulation necessary to project into the water feature 210. In this case, multiple boundary images 353-355 can be projected. Similarly, if the image aperture of the projector is sufficiently large, up to all the boundary images may be projected at once.

Though a shape is shown, here a right angle corner, the shape of the test images shown in the figures is not exhaustive of what may be used. The test image simply needs to be discernible by the user and/or the system and implemented in the drawing of the boundary. Additional intermediary steps may also be utilized and additional corrective variables may be analyzed as input by a user or sensed through a series of sensors. The placement, timing and display as well as the data collected, stored, programmed, or utilized for calculations and/or compensations may be varied without departing from the spirit of the invention and the order shown is provided as a non-limiting example.

The process of placing each projected boundary shape 351-358 in the exemplary embodiment shown is similar in each instance. Again, reference is made to the stepwise exemplary embodiment displaying each projected boundary shape 351-358 in sequence and adjusting placement individually. This is further illustrated in an obstruction in the display area of the water feature is shown here as 230, a Jacuzzi or similar obstruction for example, that is dealt with by implementing an at least one additional marker 360, here shown as multiple markers "E" 357 and "F" 358, to accommodate the changes in the boundary necessary due to the obstruction.

Further additional markers can be added as necessary to outline the display boundary line or edge 370. In other non-limiting examples, for instance, this type of variation could also simply be caused by the shape of the pool or water feature or could encompass additional water features or other similar obstructions. Additional markers 360 could be used to compensate for these obstructions as well or further additional markers, which could be added to adjust the boundary. These types of obstructions can be typically found in a water feature installation such as pool. Similar obstructions may also occur in other types of water features and bodies of water, for instance water fountains from nozzles, waterfalls, level changes, and similar design aspects of most water features need to be accommodated. Additional obstructions may also be present in naturally occurring environments, such as, but certainly not limited to, those found on sand bars and jetties from rock outcrops and the like. The instant invention allows for adjustment of the underwater projection system 100 projection boundary 370 to compensate for these obstructions, like 230, as shown through the boundary setting component with flexible input of any number of additional marker elements 360.

Figure 3:
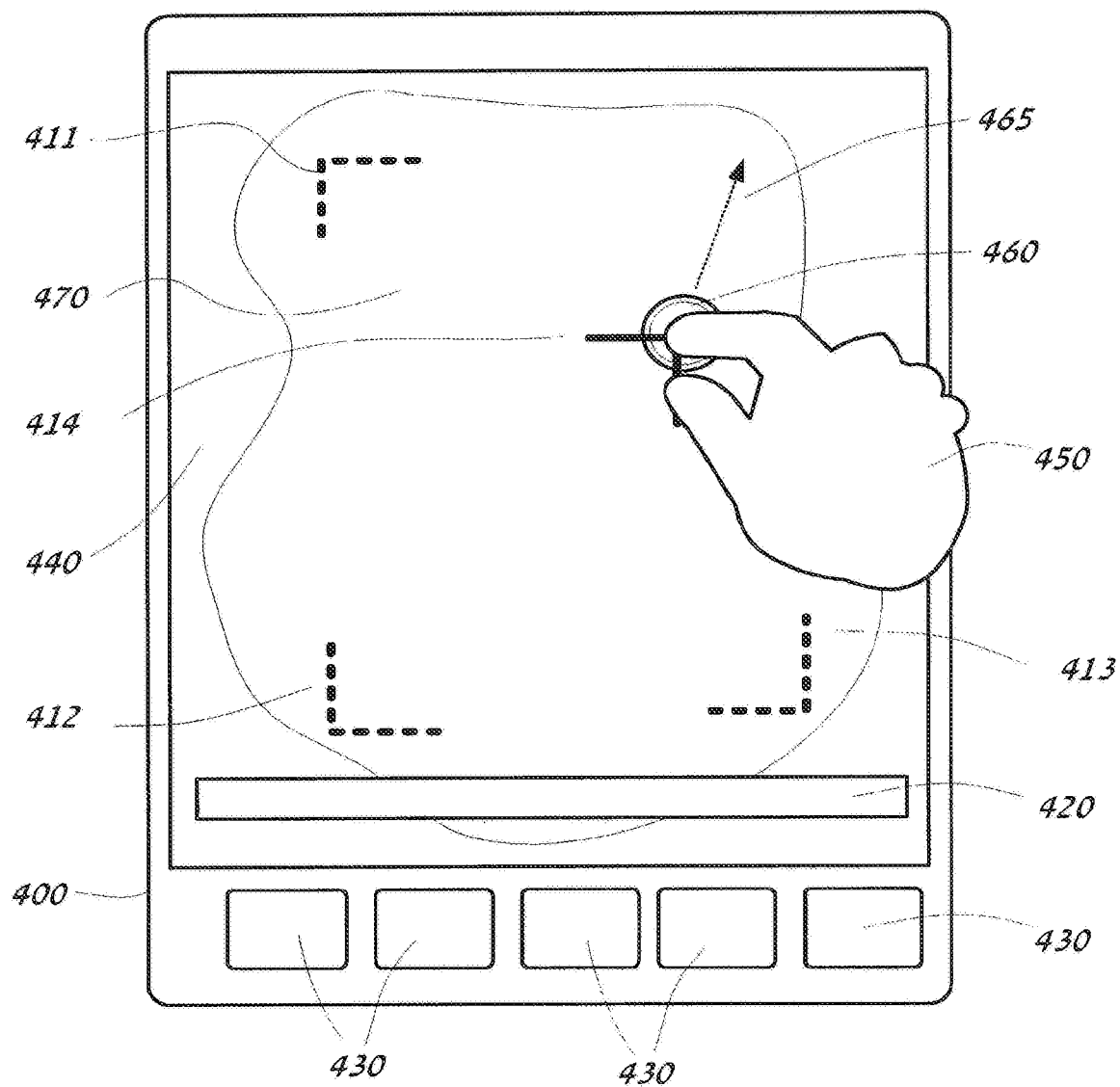
FIG. 3 shows an embodiment of the input selection process for the edge boundary operation into the boundary mapping system through a GUI by a user.

Each boundary pattern or projected boundary shape 351-358 is selected by a user 450 through the GUI 400 as further described in relation to FIG. 3. The boundary shapes may be presented to the user as a drop down menu, a graphical menu, or any other appropriate display for a variety of morphable or user configurable shapes. These shapes are mutable and morphable or configurable by the user into the desired boundary of the projection area. In this instance, a series of corners and straights are provided and placed by the user 450 with the aid of the GUI 400 by morphing or configuring a selected boundary shape, for instance the corner shown, to define the projection field or area edge or boundary 370. When selected, the boundary pattern or projected boundary shape 351-358 is selected and moved to a selected edge or boundary or perimeter 370 and fit to define various contour points. In this instance, the projected test shape "A" 353 is projected to a corner and the shape is configured as a right angle. Additional methods of inputting shapes and outlines can be provided and will function to provide the necessary guidance for boundary setting in the underwater projection system. For instance, using a pen or stylus to draw a boundary and then interpolating that boundary on a picture of the desired area is just one further example of boundary definition processes that might be utilized. The result being, as shown in FIG. 2A, the image boundary 370 is defined by user input to select and place limitations defining the boundary.

FIG. 2D shows a system view of a further embodiment of the instant invention incorporating an automatic data collection module and hardware. As seen in FIG. 2D an automated data collection module 730 can, as best seen in FIG. 7B, also be incorporated in a controller, for instance system controller 120, and hardware including an at least one sensor 512. This can include an edge detection system that can, but is certainly not limited to, determine the shape of the pool. A non-limiting example of such a system would be one that utilizes a passive sensor to determine variations in the received amount of an energy, such as light or sound, and to produce a gradient which can then be utilized to define and edge or through color variations from a video image. One non-limiting example can be, but is certainly not limited to, an infra-red sensor or camera which can detect the absorption gradient around the water feature to define the water features actual edges for the display for instance. Similar cameras or sensors in different spectrums could be utilized in conjunction with, or alternatively, to such a system to aid in automatically detecting the initial shape of the water feature for the user. These would generally be classified as passive type sensors, capturing reflected light or sound for instance to provide data.

Figure 2E:
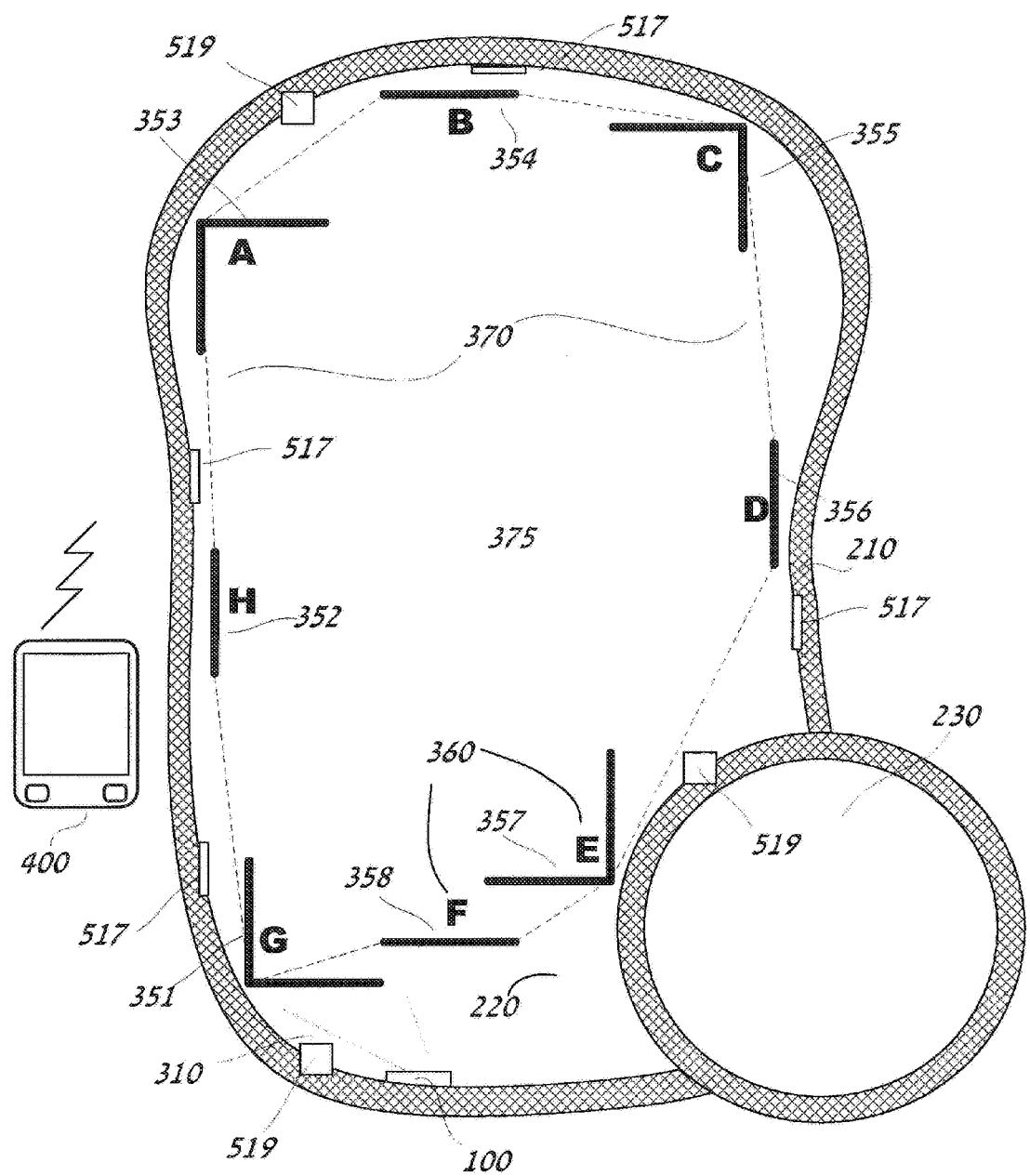
FIG. 2E shows a plan view of a further embodiment of the instant invention incorporating a further automatic data collection module and hardware.

FIG. 2E shows a further embodiment of the instant invention incorporating another embodiment of an automatic data collection module. Another type of system that might be utilized is an active mapping system using infrared or other active emissions to determine depth and dimensions. In these instances, the controller, here again the system controller 120 for example or the user interface 400, utilizes further software modules and/or hardware to facilitate image capture or transmission of data pertaining to the water feature. An at least one active emitter 517 with an at least one sensor 519, for instance but certainly not limited to an ultrasonic or LIDAR type system, using the at least one emitter 517 above or in the pool to detect distance and shape in conjunction with one or more sensors 519 acting as receivers. In this type of system, the data can be interpreted based on the location of the at least one sensors 519 to the at least one emitter 517 to determine both edge dimensions and changes in the underwater surfaces of the water feature 210. In both FIGS. 2D and 2E, these systems can be coupled to the instant invention to provide pool shape and size data using an automated data collection module on a controller.

In this way, the additional modules including the automated data acquisition module 370 can capture the information when instructed and create a boundary line 370 setting for the underwater projection system 100. This purpose can be served with other sensors such as ultrasonic or LIDAR or other active or passive sensors as noted. Generally, if the data acquired is to be for the projection border component of the projection border and image correction routine module 610, a passive system to detect the edge of the pool or a passive system alone or in conjunction with an active system can be utilized. This data could then be coupled to the projection border and image correction routine module 610 to set the edge of the water feature and then define a projection area in the boundary as noted above in relation to FIGS. 2A-2C, with adjustment by the user 450.

An active sensor can also be used for more detailed analysis of the surfaces and an improved initial boundary and projection area determination for the projection border and image correction routine module 610. The can be, for example, but is certainly not limited to, providing data in the image correction portion of the module 610 to provide the initial data points similar to the user driven setup or provide for a more automated system for initially mapping the water feature and the projection points of test images. In addition, in a still further automated embodiment, a further camera or other image sensing device (not shown) can be used to visualize the boundary images and automatically calculate the correction inputs in a manner similar to the input from the user as explained above. By visual comparison, from an observation point that is then compared to a stored known target image by image comparison software.

The data from the automated data collection module 730 can be used in conjunction with the user 450, wherein steps similar to those of the previously disclosed embodiments correct the initial setup from the automated detection modules. Alternatively, the existing modules may function directly with automated data collection modules 730, providing a user 450 with a more simplified interface, allowing for simple deformation on screen to "adjust" a final image projection determined by the map generated by the boundary setting module and image correction module using data from the automated detection module for instance.

In any case, the result of the process used is delineation in the pool or water feature or target of a boundary 370 within a body of water 220 of a projection area 375 with a projection area boundary edge 370 for the underwater image projection system 100 to project within and for which a correction map 620 is then defined for the water feature or target 210. In the exemplary embodiment disclosed herein, the GUI 400 is used to interactively shape the boundary such that the corner is opened to the dotted boundary line edge or boundary perimeter 370, as shown. The angle of the boundary line defined by this interaction that maps the corner at the location of projected test shape "A" 353 in the pool. A further edge indicator projected shape is selected by the user 450 and projected as a straight line "B" 354. This is placed as shown and the boundary 370 begins to be constructed by controller 120 joining, without displaying, the edges defined by the projected test shapes A and B 353, 354. The system proceeds with the user 450 selecting and placing components C-G in place 355-351 to define the edge boundary or boundary line 370 of the projection system. The obstruction 230 is avoided by placing the projected test shapes E and F in such a way as to modulate morph or mutate the boundary around the obstruction 230. Each projected test image 351-358 is selected and placed by a user interacting with the GUI 400. This can include the use of a guided or step by step wizard program, as further discussed herein. This placement is stored along with the modulation, morphing or configuration of the selected images and a projection image display boundary 370 is set.

FIG. 3 shows an exemplary embodiment of the input selection process for the edge boundary operation into the boundary mapping system through a GUI by a user. The GUI 400 displays a series of input selectors 430. The GUI 400 is shown being utilized by a user 450. Touch selection and control is shown in this exemplary embodiment, however, the instant invention fully embraces both analog and digital input from other input devices including but not limited to sliders, switches, buttons, external interface devices, human interface devices, and the like for both input and selection as well as execution of and interaction with the GUI 400. Again, although a touch screen GUI is shown as best mode exemplary embodiment herein, a non-touch screen controller, for example but certainly not limited to a controller having a small LED representative screen and button inputs, is fully contemplated herein. Additionally, as noted above, parts of the input may be automated through the use of certain edge boundary schema, including thermal or standard spectrum video edge detection processes or similar machine enabled edge detections software.

As noted above, a "wizard" or prompting program is used in the exemplary embodiment of the instant invention. The wizard guides the user 450 through a series of onscreen prompts and proceeds through the process of selecting boundary images and then adjusting these shapes to fit the water feature. As shown, an outline of the pool 470 is projected on the screen. This can be, for instance but is certainly not limited to, an image derived from direct input of the user, for instance by providing a subroutine to draw the pool shape and any obstacles or it can be from a stored library of pool shapes or a further embodiment may utilize an actual picture of the pool using an edge detection algorithm to define the shape or similar mechanisms for inputting the image of the shape of the pool 900 and displaying it on the GUI 400. This may be input by the user or may be derived from operation of the GUI 400, such as operation of the GUI through a cellular phone with a camera or similar image capture device.

The user selects projected boundary shapes 351-358, as noted above in relation to FIGS. 2A-2C, which are also displayed on the GUI 400 as GUI screen test images 411-414 on the GUI 400 through touch sensitive screen 440. Again, reference is made here to an exemplary embodiment utilizing a touch screen interface, the invention embraces input from all types of human interface devices including keyboard, buttons, pointer devices, and similar human interface devices. The user selects, shown as an active selection element or cursor 460, the projected boundary shapes on the screen 440 and moves, as indicated by arrow 465, the shape, here shape 414, to appropriate locations to outline changes in the boundary for the projection area boundary 370 as shown in FIG. 3. Similarly, as discussed in reference to FIGS. 2D and 2E, the system may use an automated system to generate a boundary or generate an initial boundary followed by user input to further correct the boundary.

Once placed, the GUI onscreen test image 411 is grayed out or un-highlighted, here shown as being in this state with a dotted line. In the exemplary embodiment shown, three of four of the GUI onscreen test images 411, 412, and 413 have been placed and are unselected. User 450 is placing a final GUI onscreen test shape 414 as shown by dragging it into position on the screen 440 a progress bar 420 is shown provides prompts and shows steps or percentage to completion. An additional prompt (not shown) would prompt user 450 to the next software module. This may include the deformation correction module or a further module for operating the pool or the underwater projection display system 100 or a related system. However, to operate properly in an underwater environment or in projecting on a non-uniform surface, the underwater projection system of the instant invention should be able to compensate for both variations in the projected image surface, variations in fluid variables and variations in positional variables within the water feature or target projection area.

Figure 4:
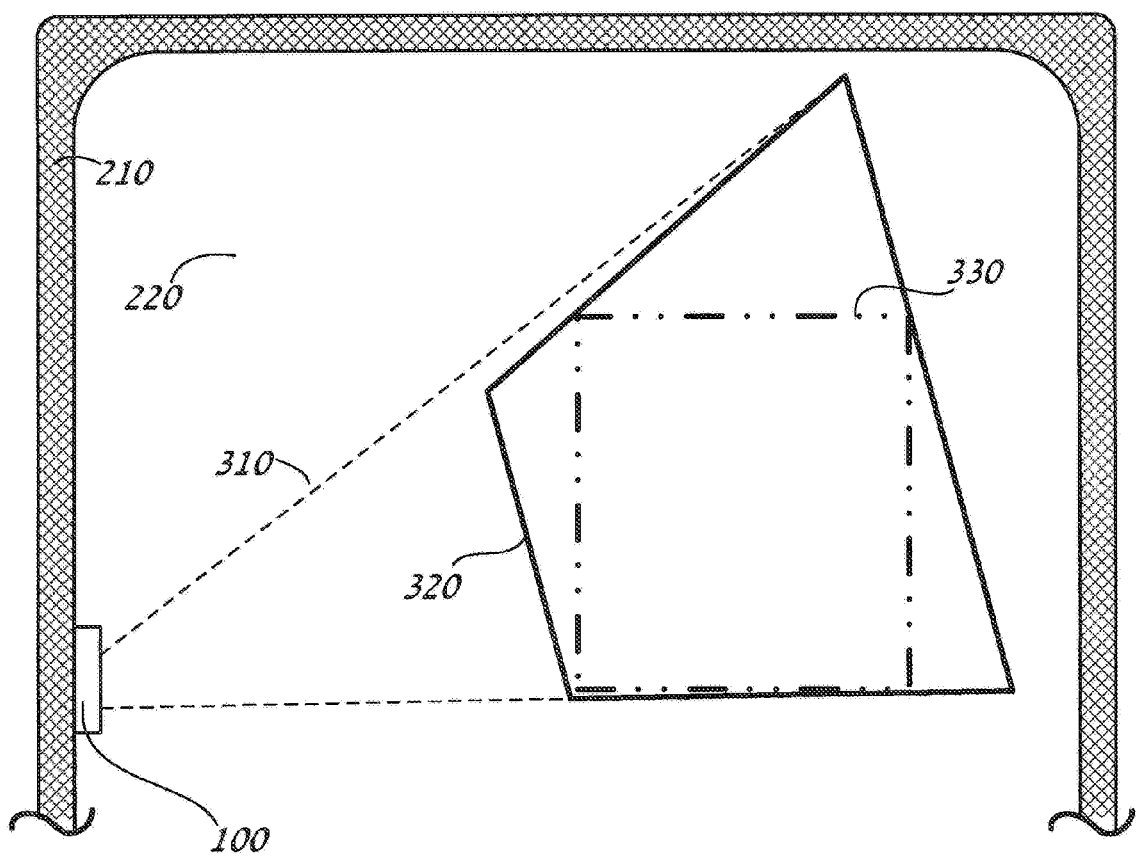
FIG. 4 shows the operation of the underwater projection system and resulting deformation due to the water feature variables and correction taken by the underwater projection system.

FIG. 4 shows the operation of the underwater projection system and resulting deformation due to the water feature variables and correction taken by the underwater projection system. In this instance, the underwater projection system 100 is shown in a water feature, in this instance in the standard light niche of a pool, projecting a test pattern or image 310 into the pool and onto the bottom of the pool. A body of water 220 is provided and the refractive nature of the water in combination with the irregular shape of the most pool bottoms leads to a deformation of the projected image as viewed by the user. The projection onto the irregular shape of the bottom surface of the water feature contributes in large part to the distortion as well because the projection source is not directly above the image plane. As a result, one end of the image is projected onto a surface that is closer to the source than the other. The side that is closer has a smaller image because the divergence is smaller. Again, a test pattern or test image target shape 411 of known dimensions, shown here as a square, is used to determine the amount of deformation in particular location in the pool based on user 450 input on the screen to correct the projected uncorrected image 320. The deformation correction is applied until the projected uncorrected image 320 is transformed into an image substantially similar to the corrected test image 330.

Reference is made below to an exemplary method of inputting these deformations by the user 450 through the GUI controller 400. Additional methods of input, interaction, and correction are also contemplated. A comparison to target implementation is made here to compensate for variables in both the shape of the projection surface and other variables, some non-limiting examples being for instance those involving fluid or transmission properties of the fluid or specific fluid flow characteristics, which are in the method described compensated for together. Other schema for determining variance in a projected image could include specific measurement and compensation for the variables in both the projection surface and the projected media as well as spatial variables. These could include triangulation and image distortion based on calculations compensating for density, transmissivity, time of day, water temperature, surface composition, surface color, background color, and the like. In either case, the basic operation of the module will result in an image correction or distortion adjustment/control map that provides a corrected image being projected from an underwater source to remain consistent as observed by a user of the projection system based on corrections for observed and/or measured variables to the input caused principally by the projection within the water media, the non-uniform target surface, and the spacial dynamics of a body of moving fluid that interfaces with a fluid of a different density that the point of observation is located within.

In broadest terms, the user interface, here GUI 400, can be used to input observations or sensed variables of the variance of the uncorrected projected image 320 of a known shape and these variances can be used as corrections in the projection for that targeted area of the water feature 210 across a defined projection area as set by a boundary. The process of entering the observed or sensed variances, for example from a point outside the water feature, can be repeated through several intermediary projected results until the projected image 310 is modified to compensate for projection variables and is thus transformed from the uncorrected image 320 to the corrected image 330. These corrections, once entered, can be stored and used during the operation of the underwater projection system 100 to correct these variances in the projected images as they are displayed in real time. The projected image may be a still image, a series of images shown as an animation, a video, or the like in any format readable by the controller as desired by the user. More specifically, an animation or series of animations is specifically embraced by the instant invention, which may include the use of one or more projection elements or projection systems to provide for fully animated "shows" or features shown on the surfaces of the underwater feature as desired by a user. Some specific examples would include, but certainly not be limited to, wildlife scenes, advertisements, animated caricatures, visually appealing geometric shapes and displays and the like.

In the exemplary embodiment shown, as best seen in Figure, on the GUI 400 touch screen 440 a display for each of the boundary locations corresponding to the perimeter 370 of the underwater projection system 100 projection as set by the user 450 through the GUI as disclosed above, where the boundary area perimeter or line or edge 370 is generated and can be stored when the boundary module is executed. The stored locations each have a target image 411 associated with the location and the user observes the distortion of the uncorrected image 320, as best seen in FIG. 4, with the target image 411 on the GUI. The user 450 inputs the resulting projected uncorrected shape 320. Corrections are calculated based on the user input. Corrections are applied and an intermediary image is shown to the user and the process of observation and correction repeats until a final corrected image 330 corresponding to the known shape is shown.

Figure 5:
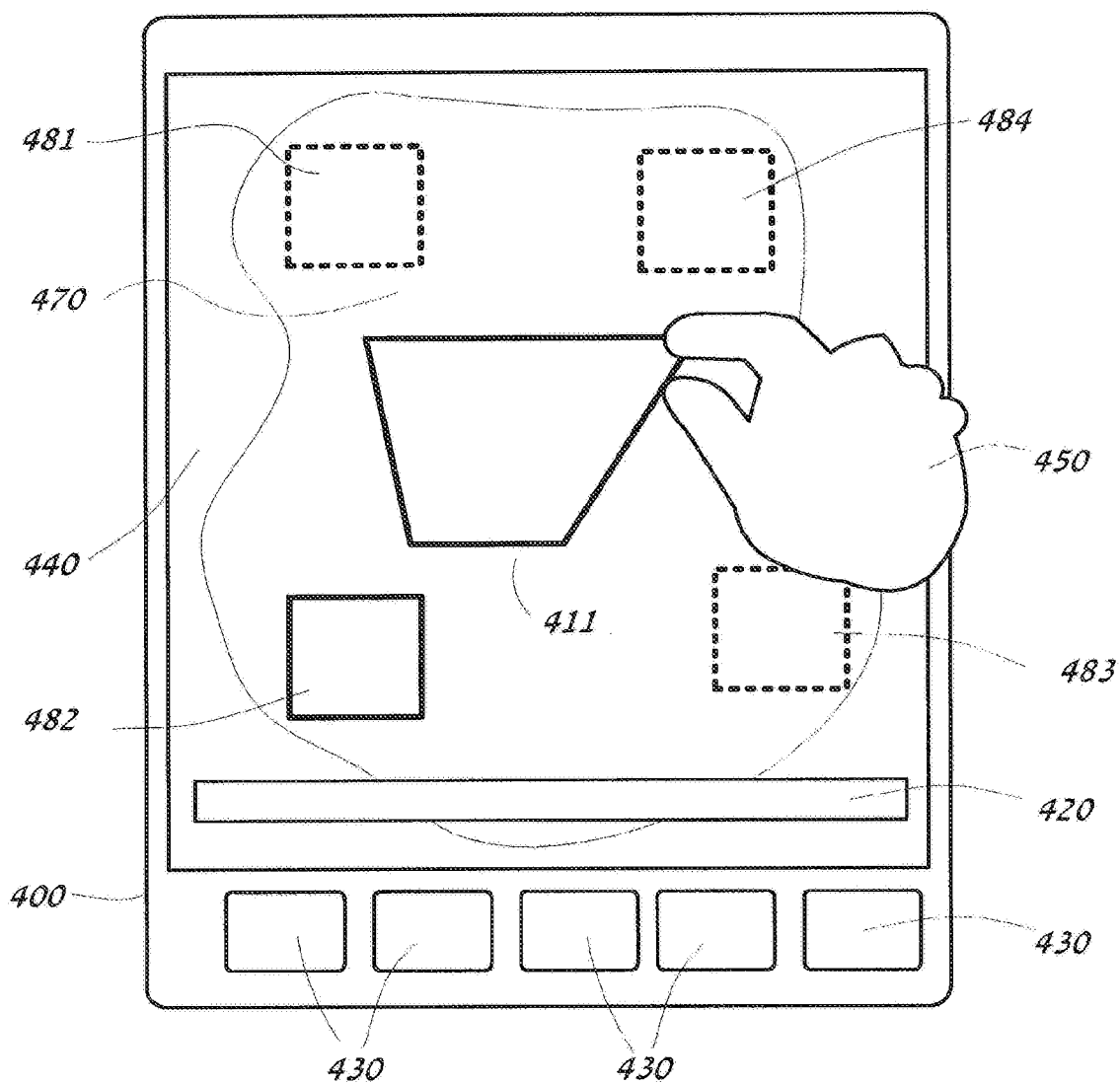
FIG. 5 shows an embodiment of the GUI of the instant invention operating on a projected test image.

FIG. 5 shows an exemplary embodiment of the GUI of the instant invention operating on a projected test image. In the exemplary embodiment shown, the GUI 400 is shown operating in the image correction mode. The GUI has a touch screen 440. Again, reference is made to a touch screen and touch input, however, one of ordinary skill in the art will understand that these inputs may be varied and any acceptable human interface devices including but not limited to touch enabled devices, button inputs, keyboards, mice, track balls, joysticks, touch pads, and other human interface devices and the like. Each area of the projection area or perimeter 510 as defined by the boundary settings operations like those described above in relation to FIGS. 1-4 is provided a test image selection marker, and the user 450 selects a test image 411 on the screen 440 as input. Each area is selected or woken by the user 450 from a hibernation state, as evidenced by the dashed lines, 481, 483, 484 and as each is set it goes dormant again. The active location 482 is shown on the screen 440 with the selected test image or target shape. The known target shape 411 can be projected on the screen and start as a regular shape, such as but not limited to squares, rectangles, octagons, and the like. The display on the screen of the user interface 400 differs from the image shown, as seen in the FIG. 4. The user through the user interface takes the displayed image and distorts it to match the distorted or uncorrected image 320 shape seen in the targeted body of water 220, for instance a pool or pond or water featured. Alternative methods of input such as drawing the image, as seen, or using a stylus or pen input or similar means of conveying the observed image are fully embraced by the instant disclosure.

The objective is to convey what is seen by the user 450 so that a degree of correction can be stored through the series of adjustments made to the output image. These adjustments are then analyzed, stored, and the projected image test pattern in the pool is updated as the adjusted figure on the screen. This is continued until the target shape 411 projected on the screen is satisfactorily met in the projection within the pool, as seen in FIG. 4, as the corrected image 330.

In this exemplary embodiment, the operating parameters are adjusted for multiple locations represented by the displayed test figures or images 481-484. Again, these are used as the target for the user input uncorrected shape 490. Once all the corrected shapes are achieved and the data is stored, a calibration table or correction map is compiled by the controller. In cases where the input is sequential, the correction map 620, as shown in FIG. 6, can also interpolate as between the points used for the input to establish the correction needed to maintain the aspect ratio of a projected image moving within the water feature. This information is shared and used by the Dynamic Content Manipulator (DCM) system.

The calibration table or correction map 620 is stored by the controller 120 as best seen in FIG. 6. The storage of the data may be in volatile or non-volatile storage. In the exemplary embodiment, the storage of the correction map 620 is in non-volatile memory, indicated as storage 600, on the controller. This allows for recall of the map without the need to run the correction routine or module at every startup of the underwater projection system 100. However, if the correction routine or module is necessary, for instance if it is used in a portable device that is moved from water feature to water feature, the information may be stored in volatile memory or alternatively an option to reset may be provided at startup. Thus, a complete correction map or calibration table 620 of the projection area within the boundary 370 is produced and stored for adjusting the projected image from the underwater projection system 100 during operation of the underwater projector.

FIG. 6A shows a further system component or module view of the controller of the instant invention. In the exemplary embodiment, the invention utilizes a touch screen display 440 in the GUI 400. Other forms of controller may be utilized including wired, wireless, computers, tablets, network enabled devices, smart phones, Wi-Fi enabled devices, and the like. The instant exemplary embodiment utilizes a web addressable server with the control software being downloaded onto a tablet device GUI 400. The controller 120 interfaces with the wireless server, which in turn is coupled through a wireless connection to through the projection system interface 650 to the controller on the underwater image projection system 100. The underwater projection system 100 in the exemplary embodiment shown also having an optional at least one addressable ambient light, for instance a high intensity/brightness LED (HBLED) for illuminating the pool with background or ambient lighting, which is controlled through the controller 120. In this way, each individual light and the underwater projection system would be addressable by the controller and singularly controlled as an element of the system. Currently, to accomplish this control, each light is on an analog switched system. That is, individual switches control power to and switch the state of the light. Using this system, a single addressable controller switches the light through a soft switch on the controller and this is interfaceable with the handheld controller through a wireless network or wireless connection.

In FIG. 6A, components or modules of the control software of the exemplary embodiment are shown. Although this is representative of the modules for control as outlined above, additional modules and functions may be added or removed without departing from the spirit of the invention. Likewise, although reference is made herein above to a network addressable control system, current technologies using switched controls may also be used in conjunction with the software to control one or more lights and the underwater projection system 100.

As seen in the figure, the instant invention comprises a GUI controller 400 in communication with a system controller 600. The software in the exemplary embodiment depicted is located on the systems controller 120. However, it may also be located on the GUI 400 and its controller. The exemplary embodiment show utilizes a projection border and image correction routine module 610 to calibrate and establish the boundary 370 of the projection area and produce a calibration table or correction map 620 as noted above. The data from this execution of this module in conjunction with the GUI controller 400 is stored as a calibration table or matrix or correction map 620. The stored information can be contained in a non-volatile memory and retained after powering down. In this way, the adjustments remain until the user or the system prompts recalibration, as noted above. Alternatively, recalibration may be forced at each startup, for instance if calibration utilizes sensors and is fully automated or may require an active election to save by a user and then saved into non-volatile memory. Content, such as image 520, is sent into the system through a content module 630. This content may be uploaded to or streamed or otherwise provided through the content module 630. The data from the content module together with the calibration map 620 are then provided to the Dynamic Content Manipulator (DCM) module 640.

The DCM 640 is responsible for manipulating the data received form the content module 630 with the measurements made in the calibration table or map 620. The data is essentially corrected for the calculated variances in the image as projected across the entirety of the bounded projection area, as herein described above. The result of the data of the content module 630 being manipulated by the data of the calibration table or map 640 is a control output for the projection system 100 and is communicated through the projection system controller interface 650 to the projection system controller. Additionally, the DCM 640 may also incorporate additional variables representing environmental variances. This can include, for instance, additional corrective variables including at least one of a variable relating to placement, timing, display of the at least one boundary image or at least one variable relating to data collected, stored, programmed or utilized for calculations relating to the water feature or environmental information on the water feature such as certainly not limited to water temperature, salinity, measure visibility, depth, material data, and the like.

FIG. 6B shows a further system component or module view of the controller of the instant invention with an automated data collection module. The embodiment shown is similar to the embodiment of FIG. 6A. However, the embodiment of FIG. 6B provides for a further automated data collection module 730 as discussed above in relation to FIGS. 2D and 2E. The added automated data collection module 730 communicates data collected from the sensors shown in FIGS. 2D and 2E to the boundary and image correction routine 610. As noted above, the data collected by the automated data collection module 730 is thus communicated back to the system.

Figure 7:
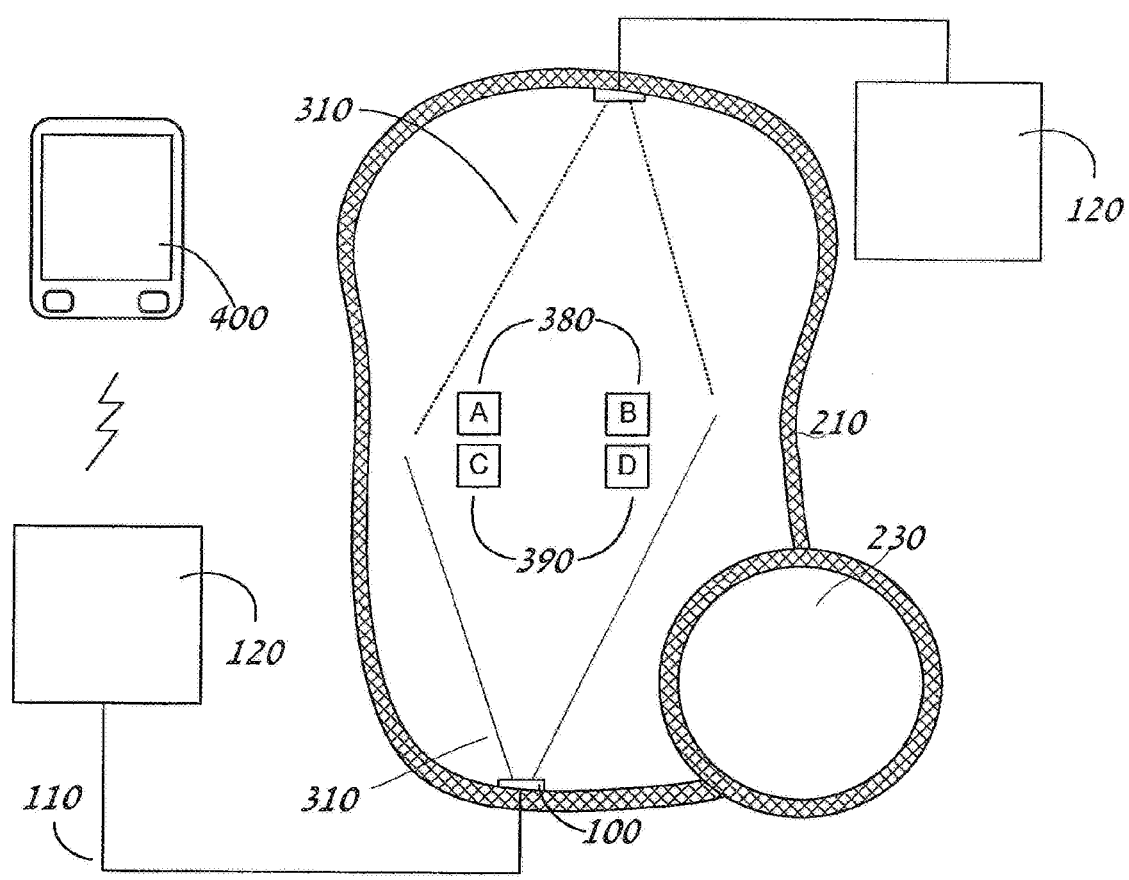
FIG. 7 shows a view of a first and second of an at least two underwater projection systems simultaneously operating.

FIG. 7 shows a view of a first and second of an at least two underwater projection systems simultaneously operating. As shown, a first of an at least two underwater projections systems 120A is shown projecting images A and B. A boundary marking function has been performed to establish, through a boundary marking module of the control software and an image correction module 610 like that above, for the projection of images A and B, collectively the first underwater projection systems images 380. The second of the at least two underwater projection systems 102B is shown similarly having completed a boundary marking function and image correction module 610 functions. The result is the display of images C and D, collectively referred to the corrected images of the second underwater projection system 390. A single GUI Controller interface 400 is provided, however, multiple such GUI Controller interfaces may be utilized as well. In addition, the GUI Controller 400 is in communication with an auxiliary, non-light amenity system, in this case a sound system. Additionally the controllers may control an at least one ambient light source, as noted in other embodiments described herein. In instances where more than one underwater image projector is provided, a single controller 120 may also be utilized to control both underwater image projectors 120A,120B.

When used in conjunction with one another, the at least two underwater image projectors have some unique control feature issues. Firstly, depending on the overall size of the pool and the boundaries circumscribed and stored on each controller, an additional step of handling overlapping projections must be included in any routines conducted by either of the at least two underwater image projection systems 100, 101. For example, as A is moved it could pass to locations outside of the boundary of the first underwater image projection systems, it may pass into the boundary of the other system. Thus, in addition to the DCM 640, an additional component must be provided to handle "handoffs" between the projection areas. This is provided in a separate module (not shown) that interrogates projection position data from each of the at least two under water projection systems 102A, 102B. The result is a seamless projection of a continuous image across boundary lines or zones. It may also be that each of the at least two under water projection systems 102A, 102B have defined projection boundaries that overlap. In this instance, the at least two under water projection systems 102A, 102B must be able to communicate relative position and share markers. This avoids over wash or sudden and erratic fluctuations from projecting the same or conflicting images into a single. Finally, in the configuration having at least two under water projection systems 102A, 102B, each system may simply operate as an independent and autonomous control. This would potentially result in distortion on interlacing images if the projections project the same or different things in the same spot.

In each case, the at least two under water projection systems 102A, 102B may communicate with the single GUI controller in order to perform the manipulations on their respective images 380, 390. Additional information may be shared in the way of edge distortion values and the calibration table or map, such that smooth transitions can be made of the images between each of the at least two underwater projection systems. Additionally, both lights may also be controlled by a single controller 102, as shown above, controlling multiple underwater image projection systems.

The embodiments and examples discussed herein are non-limiting examples. The invention is described in detail with respect to exemplary embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

The invention claimed is:

1. An underwater projection system, comprising:
a water feature including a wall and a body of water;
an ambient light in communication with the underwater projection system;
a projector disposed within the wall of the water feature and designed to project an image out of the wall of the water feature into the body of water; and
a controller in communication with the projector, the controller operating both the ambient light and the projector.

2. The underwater projection system of claim 1, wherein the ambient light is separate from the water feature.

3. The underwater projection system of claim 1, wherein the ambient light is disposed within a swimming pool.

4. The underwater projection system of claim 1, wherein the ambient light is a pool light.

5. The underwater projection system of claim 4, wherein the pool light is disposed in the wall of the water feature and projects light into the body of water.

6. The underwater projection system of claim 1, wherein the ambient light and the underwater projection system are each singularly controlled by the controller.

7. The underwater projection system of claim 1 further including a graphical user interface in communication with the controller.

8. The underwater projection system of claim 7, wherein the graphical user interface allows a user to input image data.

9. The underwater projection system of claim 8, wherein the image data is one of a still image, a series of images shown as an animation, or a video.

10. An underwater projection system, comprising:
a water feature including a wall and a body of water;
a projector disposed within the wall of the water feature;
a graphical user interface configured to receive an image from a user and in communication with the water feature; and
a controller in communication with the projector, the controller configured to project the image into the body of water.

11. The underwater projection system of claim 10, wherein the image is uploaded to the controller using the graphical user interface.

12. The underwater projection system of claim 10, wherein the image is one of a still image, a series of images shown as an animation, or a video.

13. The underwater projection system of claim 10 further including a light in communication with the underwater projection system.

14. The underwater projection system of claim 13, wherein the light and the projector are operated by the controller.

15. The underwater projection system of claim 10, wherein the controller includes at least one of a boundary mapping module or an image correction module.

16. The underwater projection system of claim 15, wherein the controller executes the at least one of the boundary mapping module or the image correction module in conjunction with displaying the image.

17. The underwater projection system of claim 10, wherein the water feature is at least one of a pool, a fountain, a spa, or a pond.

18. The underwater projection system of claim 10 further including a second projector disposed within the same water feature as the projector.

19. The underwater projection system of claim 10, wherein the controller further includes an automated data collection module.

20. The underwater projection system of claim 12, wherein the still image, the series of images shown as an animation, or the video are projected to provide a wildlife scene, an advertisement, an animated caricature, or a geometric shape.

* * * * *